United States Patent
Baltatu et al.

(10) Patent No.: US 9,094,444 B2
(45) Date of Patent: Jul. 28, 2015

(54) ANOMALY DETECTION FOR PACKET-BASED NETWORKS

(75) Inventors: Madalina Baltatu, Turin (IT); Paolo Abeni, Turin (IT)

(73) Assignee: Telecom Italia S.p.A., Milan (IT)

(*) Notice: Subject to any disclaimer, the term of this patent is extended or adjusted under 35 U.S.C. 154(b) by 297 days.

(21) Appl. No.: 13/143,062

(22) PCT Filed: Dec. 31, 2008

(86) PCT No.: PCT/IT2008/000821
§ 371 (c)(1),
(2), (4) Date: Jun. 30, 2011

(87) PCT Pub. No.: WO2010/076832
PCT Pub. Date: Jul. 8, 2010

(65) Prior Publication Data
US 2011/0267964 A1    Nov. 3, 2011

(51) Int. Cl.
H04L 12/26 (2006.01)
H04L 29/06 (2006.01)

(52) U.S. Cl.
CPC ........ H04L 63/1425 (2013.01); H04L 12/2602 (2013.01); H04L 43/00 (2013.01)

(58) Field of Classification Search
CPC ................ H04L 12/2602; H04L 63/1425
See application file for complete search history.

(56) References Cited

U.S. PATENT DOCUMENTS

| | | |
|---|---|---|
| 2004/0215972 A1 | 10/2004 | Sung et al. |
| 2005/0207413 A1 | 9/2005 | Lerner |
| 2005/0234920 A1* | 10/2005 | Rhodes ........................... 707/10 |
| 2007/0074288 A1 | 3/2007 | Chang et al. |
| 2008/0201278 A1* | 8/2008 | Muller et al. ................... 706/12 |
| 2009/0132447 A1* | 5/2009 | Milenova et al. ............... 706/12 |
| 2010/0023810 A1* | 1/2010 | Stolfo et al. .................... 714/38 |

OTHER PUBLICATIONS

International Search Report mailed Dec. 1, 2009, PCT/IT2008/000821.
J.P. Anderson Co., "Computer security threat monitoring and surveillance", Technical Report (Contract 79F296400), Washington, PA, Feb. 26, 1980 (revised Apr. 15, 1980), 56 pages.

(Continued)

Primary Examiner — Jason Mattis
(74) Attorney, Agent, or Firm — Banner & Witcoff, Ltd.

(57) ABSTRACT

Disclosed herein is an anomaly detection method for a packet-based network which includes several network resources, also called network-related software objects. The method includes monitoring the network resources of the packet-based network, ordering the monitored network resources according to a given ordering criterion, and detecting an anomaly in the packet-based network based on the ordered network resources. In particular, detecting an anomaly includes forming a detection feature vector based on the ordered network resources, and feeding the detection feature vector to a machine learning system configured to detect an anomaly in the packet-based network based on the detection feature vector. The detection feature vector includes detection feature items related to corresponding monitored network resources, and arranged in the detection feature vector depending on the ordering of the corresponding monitored network resources. Conveniently, the machine learning system is a one-class classifier, preferably a one-class Support Vector Machine (OC-SVM).

23 Claims, 3 Drawing Sheets

(56) References Cited

OTHER PUBLICATIONS

D.M.J. Tax, "One class classification, Concept learning in the absence of counter examples", Ph.D. Thesis, Technical University of Delft, 2001, 202 pages.

M.V. Mahoney et al., "An Analysis of the 1999 DARPA/Lincoln Laboratory Evaluation Data for Network Anomaly Detection", Computer Science Department, Florida Institute of Technology, Melbourne, FL, 2003, 20 pages.

S. Kaplantzis et al., "Study on Classification Techniques for Network Intrusion Detection", 2006 IASTED, 6 pages.

H. Deng et al, "SVM-based Intrusion Detection System for Wireless Ad Hoc Networks", Proceedings of the IEEE Vehicular Technology Conference, Oct. 2003, IEEE 58th vol. 3, pp. 2147-2151.

S. Forrest et al., "A sense of self of Unix processes", Proceedings of the 1996 IEEE Symposium on Security and Privacy, IEEE Computer Society Press, Los Alamitos, CA, pp. 120-128 (1996).

D. Mutz et al., "Anomalous system call detection", ACM Transactions on Information and System SECurity (TISSEC), 2006, vol. 9, No. 1, pp. 61-93.

\* cited by examiner dist (A,B) = 2 + 2 + 2 + 1 + 1 = 8

ANOMALY DETECTION FOR PACKET-BASED NETWORKS

CROSS REFERENCE TO RELATED APPLICATIONS

This is a U.S. National Phase Application under 35 U.S.C. § 371 of International Application No. PCT/IT2008/000821, filed Dec. 31, 2008, which was published Under PCT Article 21(2), the entire contents of which are incorporated herein by reference.

TECHNICAL FIELD OF THE INVENTION

The present invention relates in general to anomaly detection for packet-based networks. In particular, the present invention finds advantageous, but non-exclusive, application in networks based on Internet Protocol (IP).

BACKGROUND ART

As is known, anomaly detection for packet-based networks is intended to detect an anomalous behaviour in a packet-based network, such as an IP-based network.

Generally, the anomaly detection, which was proposed for the first time in network and computer security by J. P. Anderson in *Computer security threat monitoring and surveillance*, Technical Report, Wash., Pa., James P. Anderson Co., is based on establishing statistical models for normal behaviour of a monitored object, such as a network or a program or a user activity. Subsequently, a live measure/sample of the monitored object is compared with the statistical model, and an alert is issued if such measure/sample presents a significant deviation from the statistical model.

Currently, a plurality of methods implementing anomaly detection for network infrastructures are known, few of which use machine learning paradigms, such as a Support Vector Machine (SVM) or a one-class Support Vector Machine (OC-SVM).

A main purpose of using machine learning techniques is to achieve a generalization capability which allows, given an available training data set, to correctly classify future data as normal or anomalous.

In fact, as, for example, described in D. M. J. Tax, *One class classification, Concept learning in the absence of counter examples*, Ph.D. thesis, Technical University of Delft, 2001, SVM-based classifiers are generally trained through supervised learning, in which a machine computes the best function relating output data to input data. The goodness of this function is judged by its ability to generalize on new inputs, i.e., inputs which are not present in the training data set.

In TCP/IP networks, SVMs are used for detecting intrusions and misbehaviours. For example, based on the Defence Advanced Research Projects Agency (DARPA) database for Intrusion Detection System (IDS) evaluation (benchmark created by Lincoln Laboratory of Massachusetts Institute of Technology from 1998 to 2000), the SVMs are trained on existent attack data, such as probing attacks, Denial-of-Service (DoS) attacks, etc. The features on which these SVMs work are the 41 TCP connection features, such as IP addresses, port numbers, TCP flags, packets size, etc., included in the DARPA database, or on a subset of these features, as described in M. V. Mahoney and P. K. Chan, *An Analysis of the 1999 DARPA/Lincoln Laboratory Evaluation Data for Network Anomaly Detection*, Computer Science Department, Florida Institute of Technology 150 W. University Dr., Melbourne, Fla. 32901.

Moreover, as shown in S. Kaplantzis, N. Mani, *A Study on Classification Techniques for Network Intrusion Detection*, presented in 2006 at the IASTED International Conference on Networks and Communication Systems, Thailand, SVMs are comprehensively more accurate for IDS than other machine learning approaches, such as Artificial Neural Networks (ANN), K-means classifiers, Multivariate Adaptive Regression Splines (MARS), and Linear Genetic Programming.

Another area in which the use of SVMs was proposed is intrusion detection in wireless ad hoc networks. In this case the intrusion detection functionality is meant to detect anomalous behaviour in network traffic, which also includes routing traffic. For a detailed description of intrusion detection in wireless ad hoc networks, reference may be made to H. Deng, Q.-A. Zeng, D. P. Agrawal, *SVM-based Intrusion Detection System for Wireless Ad Hoc Networks*, Proceedings of the IEEE Vehicular Technology Conference, October 2003, IEEE 58th Volume 3, 6-9 October 2003 pages: 2147-2151 Vol. 3.

Furthermore, a whole category of host IDS uses system call sequences to decide if a computer is under attack or not. Such approaches build a model of the correct or normal short system call sequences when the computer is used by authorized users, and use this model to decide either if the current user is non authorized or if an intrusion is ongoing. Such approach, usually, builds a database with admissible short sequences of system calls during training, and compares new sequences against those stored in the database during detection. If the new sequence is found in the database the user behaviour is considered normal. The sequences have to match exactly, since a little deviation from the model can mean that a malicious program is being executed by the user. For a detailed description of system-call-sequence-based IDS, reference may be made to S. Forrest, S. A. Hofmeyr, A. Somayaji, *A sense of self of Unix processes*, Proceedings of the 1996 IEEE Symposium on Security and Privacy, and to D. Mutz, F. Valeur, C. Kruegel, G. Vigna, *Anomalous system call detection*, ACM Transactions on Information and System SECurity (TISSEC), 2006, volume 9, number 1, pages 61-93.

OBJECT AND SUMMARY OF THE INVENTION

The Applicant has noted that, for a broadband packet-based network, such an IP-based network, all known anomaly detection methods are excessively computationally-intensive and time-consuming, since they are based on network-related feature computation and monitoring which, in turn, are very computationally-intensive and time-consuming. As a consequence, such methods are computationally unpropitious for a real-time intrusion detection system working on high velocity and high bandwidth networks, such as those ones composing nowadays Internet.

Therefore, an objective of the present invention is to provide a methodology which can alleviate at least in part the above cited drawbacks, and, in particular, which allows anomalies in the behaviour of packet-based networks to be detected in real time and hence without involving a computationally-intensive and time-consuming data processing.

Moreover, the Applicant has also noted that the known methods are aimed at detecting a limited amount of anomalies in the behaviour of packet-based networks, and hence have a good/reliable behaviour/performance only for those anomalies they are planned to detect.

Therefore, another objective of the present invention is to provide a methodology which allows a large spectrum of anomalies in the behaviour of packet-based networks to be efficiently and reliably detected.

These and other objectives are achieved by the present invention in that it relates to a method, a system, and a software program for detecting anomalies for packet-based networks, as defined in the appended claims.

Therefore, the present invention achieves the aforementioned objectives by
  monitoring network resources of a packet-based network;
  ordering the monitored network resources according to a given ordering criterion; and
  detecting an anomaly in the packet-based network based on the ordered network resources.

Conveniently, detecting an anomaly comprises:
  forming a detection feature vector based on the ordered network resources; and
  feeding the detection feature vector to a machine learning system configured to detect an anomaly in the packet-based network based on the detection feature vector.

Conveniently, the detection feature vector comprises detection feature items related to corresponding monitored network resources, and arranged in the detection feature vector depending on the ordering of the corresponding monitored network resources.

Conveniently, the detection feature items are arranged in the detection feature vector according to an order identical to the ordering of the corresponding monitored network resources.

Conveniently, the monitored network resources are ordered based on a respective amount of data traffic generated or received by each monitored network resource.

Conveniently, the machine learning system is a one-class classifier, preferably a one-class Support Vector Machine (OC-SVM).

BRIEF DESCRIPTION OF THE DRAWINGS

For a better understanding of the present invention, preferred embodiments, which are intended purely by way of example and not to be construed as limiting, will now be described with reference to the attached drawings, wherein.

DETAILED DESCRIPTION OF PREFERRED EMBODIMENTS OF THE INVENTION

Figure 1:
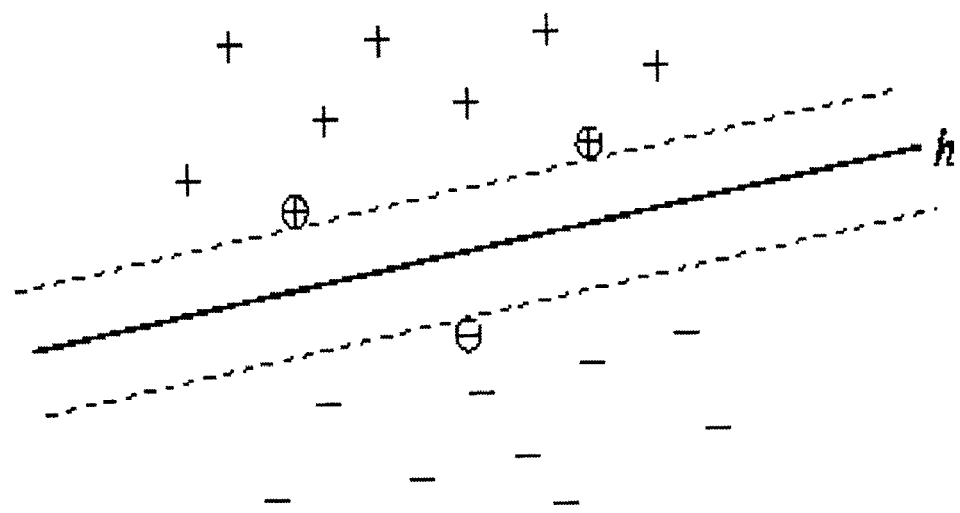
FIG. 1 shows a hyperplane, separating positive and negative training examples, and support vectors in a high-dimensional feature space of an SVM.

The following description is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited only to the embodiments shown, but is to be accorded the widest scope consistent with the principles and features disclosed herein and defined in the attached description and claims.

In addition, the present invention is implemented by means of a software program including software code portions for implementing, when the software program is loaded in a memory of a processing system and run thereon, the anomaly detection method described hereinafter.

In the followings, for the sake of description simplicity and without losing generality, the present invention will be described with specific reference to IP-based networks, remaining clear that the present invention may also be applied to other types of packet-based networks.

The Applicant has carried out an in-depth study of IP-based networks in order to investigate the possibility of developing an anomaly detection methodology which allows a large spectrum of anomalies in the behaviour of IP-based networks to be efficiently and reliably detected in real time and, hence, without involving a computationally-intensive and time-consuming processing.

Therefore, according to a first aspect of the present invention, a large spectrum of anomalies in the behaviour of an IP-based network may be efficiently and reliably detected in real time and without involving a computationally-intensive and time-consuming data processing by:
  monitoring network resources of the IP-based network;
  ordering the monitored network resources according to a given ordering criterion; and
  detecting an anomaly in the packet-based network based on the ordered network resources.

In particular, the network resources are network-related software objects belonging to one of following categories:
  ports of the IP-based network;
  network applications;
  IP addresses;
  specific protocol message types, e.g., Transmission Control Protocol (TCP) packet types, the TCP packet type being given by combination of TCP flags present in TCP packet headers;
  over-IP protocols, i.e., network protocols encapsulated in the IP protocol, e.g., TCP, User Datagram Protocol (UDP), Authentication Header (AH), Encapsulated Security Payload (ESP), etc.;
  Internet Control Message Protocol (ICMP) messages; and
  routing protocols messages, e.g., Open Shortest Path First (OSPF) messages, Routing Information Protocol (RIP) messages, Border Gateway Protocol (BGP) messages, etc.

For example, in a first possible implementation of the present invention, anomalies in the behaviour of the IP-based network may be detected by monitoring the ports of the IP-based network.

Moreover, in a second possible implementation of the present invention, anomalies in the behaviour of the network applications accessible via TCP and/or UDP may be detected by monitoring TCP and/or UDP ports.

In this respect, it may be useful to underline that the network applications are defined as $4^{th}$ layer protocol, and port number couples. For example, the couple <protocol TCP, port 80> identifies web-based applications which use TCP as transport protocol and port 80 to listen for client requests.

Furthermore, in a third possible implementation of the present invention, anomalies in the behaviour of the IP-based network may be detected by monitoring source and/or destination IP addresses, and/or by monitoring any IP-based network protocol which uses the ports and/or different message types.

Moreover, the monitored network resources are ordered based on corresponding traffic received or generated by each of the network resources.

In particular, among the monitored network resources, most-used network resources are identified, the most-used network resources being those monitored network resources which receive and/or generate the most of traffic. The traffic is expressed in terms of bits per second (bps) or packets per second (pps).

Moreover, according to a second aspect of the present invention, the anomaly detection is based on using a machine learning system for detecting intrusions and misbehaviors of the IP-based network.

In particular, detecting an anomaly comprises:
forming a detection feature vector based on the ordered network resources; and
feeding the detection feature vector to a machine learning system configured to detect an anomaly in the packet-based network based on the detection feature vector.

In detail, the detection feature vector comprises detection feature items which are related to corresponding monitored network resources, and are arranged in the detection feature vector depending on the ordering of the corresponding monitored network resources.

Conveniently, the detection feature items are arranged in the detection feature vector according to an arrangement order identical to the ordering of the corresponding monitored network resources.

Furthermore, the machine learning system is, conveniently, a one-class classifier, preferably a one-class Support Vector Machine (OC-SVM).

One of the main advantages of using an OC-SVM classifier lies in the fact that the normal class model, i.e., the model associated to the normal behaviour of the monitored IP-based network, is obtained only from positive training examples. The model consists of a set of support vectors which define a hyper-surface, in the followings called for simplicity hyper-sphere, that encloses all possible normal class representations. All observations, i.e., input vectors, lying outside this hypersphere are considered anomalous, i.e., they correspond to attack or network failure situations, and/or other anomalies. Since only the normal class representation is necessary for training, the present invention is significantly less resource consuming than traditional SVM-based approaches. As a consequence, it is faster and more appropriate for real-time anomaly detection method in broadband networks.

Another important advantage of using OC-SVM lies in the high detection reliability achieved by such a technique which allows a large spectrum of anomalies to be reliably detected, since the OC-SVM is trained on the normal behaviour of the monitored IP-based network, i.e., the normal class model, contrary to known methods which normally have a good/reliable behaviour/performance only for those anomalies they are planned to detect.

A further important advantage of using OC-SVM lies in the conspicuous classification precision and detection speed achieved by such a technique with respect to other proposed methods, such as Neural Networks, k-Nearest Neighbour classifiers, Statistical methods, Data Mining methods, etc., thus permitting a significant reduction in False Positives and False Negatives rates.

Some mathematical notations relating to OC-SVM are introduced hereinafter to facilitate understanding of its employment in the present invention.

SVMs can be applied to regression, classification, and density estimation problems.

Briefly, SVMs belong to the category of maximum-margin classifiers, and they naturally perform binary classification (i.e. they have two output classes), by finding, in the feature space of the SVM, a decision hypersurface (usually a hyperplane) that splits the positive examples from the negative examples, the split being such as to have the largest distances from the hypersurface to the nearest of the positive and negative examples, generally making the classification correct for testing data that is near, but not identical to the training data.

Focusing on classification, SVMs receives as input an independent and identically distributed (i.i.d.) training sample $S=(x_1,y_1), (x_2,y_2), \ldots, (x_n,y_1)$, of size n from a fixed but unknown distribution $Pr(x,y)$ describing the learning task, wherein $x_i$ are vectors representing the input data to be classified (the observations), while $y_i$, typically in the set $\{-1,+1\}$, are the class labels.

In their basic form, SVMs learn binary, linear decision rules in the form:

$$h(x) = \begin{cases} \text{sign } (w \cdot x + b) & \text{if } w \cdot x + b \geq 0 \\ -1 & \text{otherwise} \end{cases}$$

The decision function, also known as hypothesis, is described by a weight vector w and a threshold b. According to which side of the hypersurface the input vector x lies on, it is classified into class +1 or −1. The idea of structural risk minimization is to find a hypothesis h for which the lowest error probability can be guaranteed. With SVMs, Vapnik showed that this goal can be translated into finding the hypersurface with largest margin for separable data. In other words, for separable training sets, SVMs find the hypersurface h, which separates the positive and negative training examples, marked with "+" and "−", respectively, in FIG. 1, with largest margin. The examples closest to the hypersurface h are called support vectors, marked with circles in FIG. 1.

Computing the hypersurface is equivalent to solving the following quadratic optimization problem in the Lagrangian representation (for more details reference may be made to N. Cristianini, J. Shawe-Taylor, *An Introduction to Support Vector Machines and other kernel-based learning methods*, Cambridge University Press, 2000, pp. 93-122):

$$\text{minimize } W(\alpha) = -\sum_{i=1}^{n} \alpha_i + \frac{1}{2}\sum_{i=1}^{n}\sum_{j=1}^{n} y_i y_j \alpha_i \alpha_j x_i x_j$$

$$\text{subject to } \sum \alpha_i y_i = 0, \forall \alpha_i, 0 \leq \alpha_i \leq C, i = 1, \ldots, n$$

Support vectors are those training vectors $x_i$ corresponding to positive Lagrangian coefficients $\alpha_i > 0$. From the solution of this optimization problem the decision rule can be computed as:

$$w \cdot x = \Sigma \alpha_i y_i x_i x \text{ and } b = y_{tsv} - w \cdot x_{tsv}$$

The training example $(x_{tsv}, y_{tsv})$ for calculating b must be a support vector with $\alpha_{tsv} < C$.

For both solving the quadratic optimization problem as well as applying the learned decision rule, it is sufficient to be able to calculate inner products between observation vectors. Exploiting this property, the use of kernel functions, denoted by $K(x_1, x_2)$, was introduced for learning non-linear decision rules. Such kernel functions calculate an inner product in some high-dimensional feature space and replace the inner product in the formulas above.

Popular kernel functions are linear, polynomial, Radial-Basis Function (RBF), and sigmoid:

$$K_{lin}(x_i,x_j)=x_i \cdot x_j$$

$$K_{poly}(x_i,x_j)=(x_i \cdot x_j+1)^p$$

$$K_{rbf}(x_i,x_j)=\exp(-(x_i-x_j)^2/s^2)$$

$$K_{sig}(x_i,x_j)=\tan h(s(x_i \cdot x_j)+c)$$

Therefore, depending on the type of the kernel function, SVMs can be linear classifiers, polynomial classifiers, radial basis function (RBF) classifiers, or two-layer sigmoid neural networks.

Normal SVM classifiers represent supervised learning procedures that need positive and negative examples for training to obtain a model of both the normal class, i.e., how the system is supposed to behave in the absence of attacks and anomalies such as failure conditions, and the complementary class, i.e., the anomalous/atypical behaviour.

The limit of such a mechanism is that, for a highly reliable recognition of anomalies, i.e., with a low error rate, a huge number of negative examples are required in practice. The number of negative examples has to cover as much as possible of the anomalous conditions that can be encountered in the modeled object's behaviour.

This approach, apart from being scarcely feasible, since it is both time-consuming and difficult to predict all anomalous situations in a complex network infrastructure, is also contrary to the paradigm of anomaly detection.

In fact, the detection engine is supposed to model only the normal behaviour of the object, possibly without requiring any additional information.

On the contrary, in OC-SVMs (One-Class Support Vector Machines) the support vectors characterizing the object's class are obtained only from positive training examples. In particular, such support vectors define a hypersphere that encloses all possible representations of the object. All observations (input vectors) lying outside this hypersphere are considered not correct or anomalous representations.

Therefore, the present invention exploits OC-SVM-based mechanism which requires only the description of the correct class, i.e., the normal behaviour class, for the modeled system, i.e., the IP-based network.

As a consequence, the reference SVM model per monitored network is built only from positive training examples representing the normal class. The solution is based on the use of OC-SVM with a particular set of features and a specific distance function for modeling the IP-based network and for real-time anomalies detection in such network.

The problem the OC-SVM has to solve is the estimation of a model function h(x, w) which gives a closed boundary around the target class data (reference may for example be made to D. M. J. Tax, *One-class classification*, Concept learning in the absence of counter examples, Ph.D. thesis, Technical University of Delft, 2001). This closed boundary is a hypersphere that contains all the training objects $X^{tr}$, and that is characterized by a center a and a radius R, as illustrated in FIG. 2.

Figure 2:
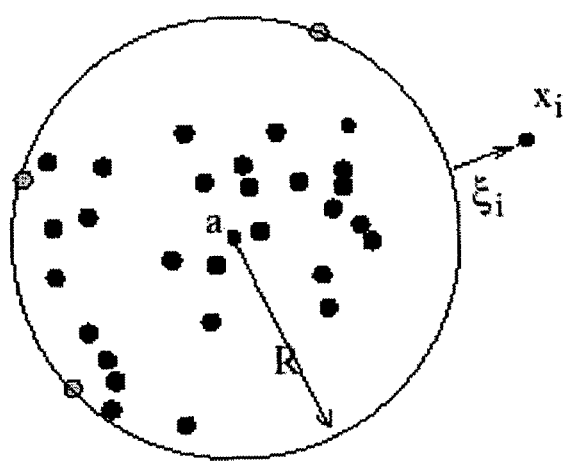
FIG. 2 shows a hypersphere containing training vectors, and support vectors in a high-dimensional feature space of an OC-SVM.

In particular, in FIG. 2 three objects are on the boundary of the hypersphere, and these three objects are the support vectors, while an object $x_i$ is outside the hypersphere since it has $\xi_i>0$, where $\xi_i$ is a measure of the classification error (i.e. the difference between the distance from object $x_i$ to the center a and the radius of the hypersphere R).

Basically, the OC-SVM minimizes the structural error defined as:

$$E(R,a)=R^2$$

subject to the following constraint:

$$|x_i-a|^2 \le R^2, \forall i$$

To allow the possibility of outliers in the training set, and therefore to make the method more robust, the distance from objects $x_i$ to the center a is not strictly smaller than $R^2$, but larger distances are penalized. This means that the empirical error is not zero, so slack variables $\xi$, $\xi_i>0$, $\forall i$ are introduced and the minimization problem becomes:

$$E(R,a,\epsilon)=R^2+C \cdot \Sigma_i \xi_i$$

with the constraint that almost all objects are within the following hypersphere:

$$|x_i-a|hu \, 2 \le R^2+\xi_i, \forall i$$

Parameter C gives the trade-off between the volume of the description and the errors. By introducing Lagrange multipliers and constructing the Lagrangian, the minimization of this error is a well-known quadratic programming problem, for which standard algorithms exist (reference may again be made to the above-referenced *One-class classification*).

By solving this problem the support vectors are obtained (which practically represent the object's reference model or template) together with the following expression for the center a of the hypersphere:

$$a = \sum_i \alpha_i x_i$$

As such, new objects are accepted by the description if the distance of the objects from the center a of the hypersphere is lower than or equal to the radius R.

Noteworthy issues related to OC-SVM are the training set construction, the SVM input data representation (feature selection), and the SVM parameter tuning. Finding the right solution to these issues is a sine qua non condition for the success of the anomaly detection process.

The present invention proposes a particular training set construction method, a working optimized representation of the input data together with an appropriate distance metric and an automatic method for SVM parameters configuration.

Moreover, the present invention also proposes a real-time update, or adaptation, mechanism for the reference template: as a first measure raise the alarm, but nevertheless incorporate the violating vector into the normal behaviour template if the distance from the template is under a configured threshold value.

Specifically, in the followings OC-SVM-based anomaly detection will be described in terms of an anomaly detection system.

Figure 3:
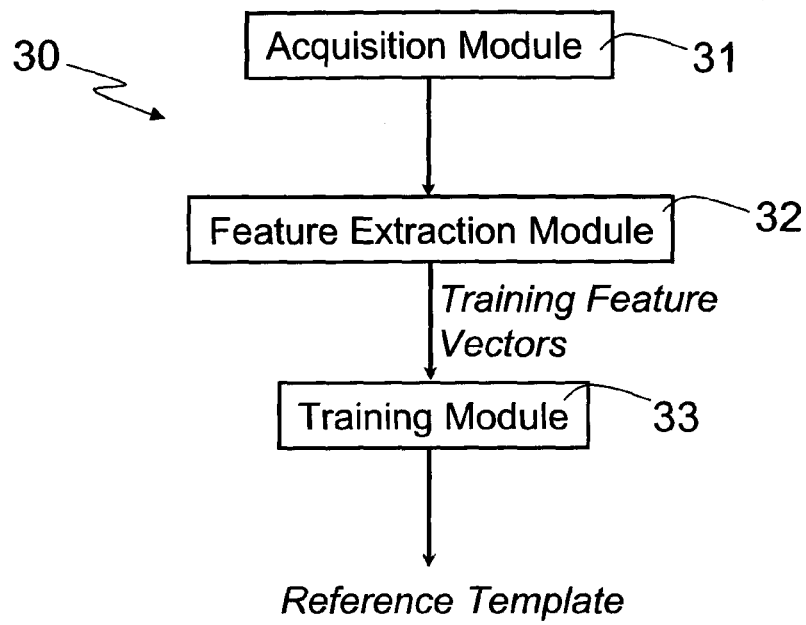
FIG. 3 shows a flow chart describing training of an OC-SVM according to an embodiment of the present invention.
Figure 4:
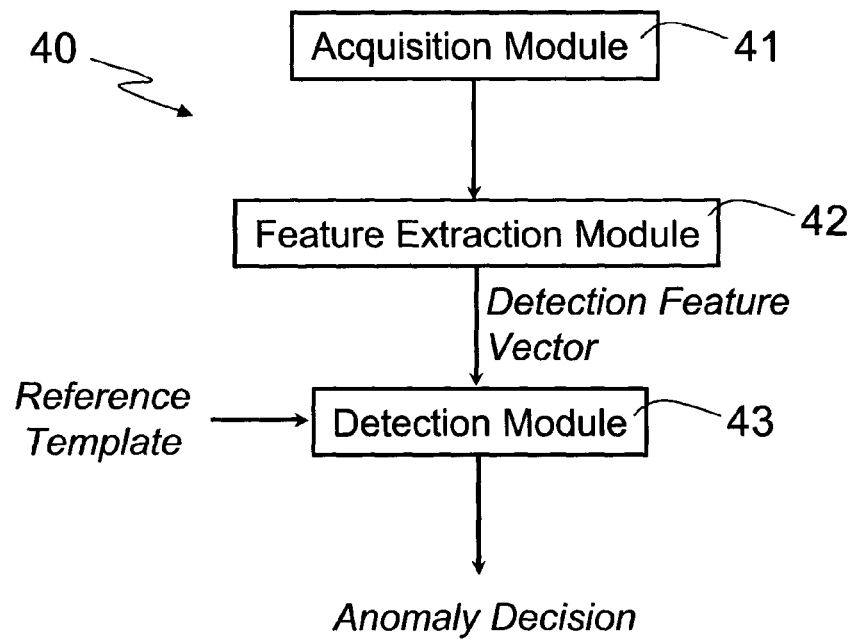
FIG. 4 shows a flow chart describing anomaly detection for packet-based networks according to an embodiment of the present invention.

In particular, the anomaly detection system comprises two software components showed, respectively, in FIGS. 3 and 4: a training software component 30, and an anomaly detection software component 40, each comprising several software modules.

In detail, according to FIG. 3, the training software component 30 comprises:

an acquisition module (collector) 31, which is configured to acquire training samples, such as raw traffic data or also netflow data of the IP-based network or other forms of traffic data, for instance from a security appliance, from the IP-based network preferably during a free-of-attacks and free-of-failures training period only;

a feature extraction module 32, which is configured to extract training ordered sequences from the acquired training samples, e.g., the most-used network applications, the most-used IP addresses or the most-used control message types (in decreasing order by the amount of generated traffic), and to form training feature vectors containing the training ordered sequences; and a training module 33, which is a configured to create a normal class model, or reference template, comprising Support Vectors (SVs) that will be used for anomaly detection, the reference template being created based on the training feature vectors.

The SVs together with some OC-SVM specific parameters represent the normal class model, i.e., the normal behaviour of the IP-based network.

Moreover, according to FIG. 4, the anomaly detection software component 40 comprises:

an acquisition module (collector) 41, which is configured to acquire in real time from the IP-based network detection samples, such as raw traffic data or also netflow data of the IP-based network or other forms of traffic data, for instance from a security appliance;

a feature extraction module 42, which is configured to monitor the network resources of the IP-based network by extracting detection ordered sequences from the acquired detection samples, e.g., the most-used network applications, the most-used IP addresses or the most-used control message types (in decreasing order by the amount of generated traffic), the feature extraction module 42 being further configured to form detection feature vectors containing the detection ordered sequences; and a detection module 43, which is configured to perform an anomaly decision based on the detection feature vectors and the reference template.

Conveniently, the detection module 43 is further configured to issue an alarm together with an attached severity level based on the performed anomaly decision.

In detail, the acquisition modules 31 and 41 are implemented in collectors which are part of the IP-based network or which receive the traffic generated by the IP-based network. The collectors are common network devices which have access to all IP data that travel on the IP-based network. The collectors may be Personal Computers (PCs), routers, or security appliances.

Moreover, the acquisition module 31, in use, acquires from the IP-based network all IP packets traveling through the IP-based network, eliminates duplicates, and provides the feature extraction module 32 with the acquired IP packets without the duplicates.

Preferably, the acquisition module 31 acquires all the IP packets traveling through the IP-based network during a free-of-attacks and free-of-failures training period only.

Furthermore, the acquisition module 41, in use, acquires in real time from the IP-based network all IP packets traveling through the IP-based network, eliminates duplicates, and provides the feature extraction module 42 with the acquired IP packets without the duplicates.

The sampling interval, i.e., periodicity of sample collection process, for both the acquisition modules 31 and 41 may depend on capability of underlying network (i.e., netflow data generation period of the routers), and may vary from 1 to 5 minutes.

Moreover, the proposed anomaly detection can work with different sets of features extracted from IP traffic data. Even if hereinafter it will be described the use of some sets, other sets can be used, since the invention provides an automatic procedure for computing the necessary SVM parameters for each new type of feature set.

In detail, the feature extraction modules 32 and 42, in use, select, among the IP packets provided by the acquisition modules 31 and 41, those IP packets that encapsulate data related to the network resources to be monitored.

Furthermore, the feature extraction modules 32 and 42, in use, group (or aggregate) for each network resource to be monitored corresponding IP messages among the selected IP messages, the corresponding IP messages being those selected IP messages that encapsulate data related to the network resource to be monitored.

Then, the feature extraction modules 32 and 42 compute for each network resource to be monitored a respective number of packets and/or bytes generated by the network resource based on the grouped corresponding IP messages, and order the network resources depending on the respective computed number of packets and/or bytes generated by each network resource, i.e., depending on the amount of data traffic generated by each network resource.

Moreover, the feature extraction module 32 create a training ordered sequence of training feature items corresponding to the first N ordered network resources, i.e., the N most-used network resources, since the first N ordered network resources are the network resources generating the most of the traffic among the network resources to be monitored, N being a configurable parameter. Then the feature extraction module 32 form a training feature vector containing the training ordered sequence of the training feature items.

Accordingly, the feature extraction module 42 create a detection ordered sequence of detection feature items corresponding to the first N ordered network resources, i.e., the N most-used network resources, since the first N ordered network resources are the network, resources generating the most of the traffic among the monitored network resources. Then the feature extraction module 42 form a detection feature vector containing the detection ordered sequence of the detection feature items.

For example, if the network applications are to be monitored, the IP packets that encapsulate application data are grouped (or aggregated) per port, and the number of packets and/or bytes generated by each port is computed. Then the top most-used N network applications are identified.

If the IP source/destination addresses are to be monitored, the aggregation is performed by IP address identifier, while for control messages, the aggregation is performed by message type, and so on.

It may be useful to note that other aggregations are possible, depending on parameter that is used for classification, e.g., the same logic can be applied on any other field of interest of the examined packets or packet headers.

The feature vectors used for training and detection contain the sequences of N values extracted in a decreasing order by the amount of packets and/or bytes.

Each feature vector refers to a specific category of network resources, e.g. the 4th level protocol (TCP, UDP) or control protocol (ICMP) or IP address.

If the anomaly detection system is configured to detect anomalies on both bytes and packets, the number of vectors per category is doubled.

An important feature of the anomaly detection system is the dynamic configuration of application or server ports. The system can work on data aggregated by destination port, but can also take into consideration traffic aggregated per source port if such ports are well-known, i.e., are among the Interned Assigned Numbers Authority (IANA) registered TCP/UDP ports, or if such ports generate significant amounts of traffic on a regular basis within the monitored IP-based network.

Moreover, the training module 33 computes and outputs the normal class model, or the reference template, i.e., the normal behavior of the traffic in the monitored IP-based network, based on only positive examples, i.e., the training feature vectors.

Mathematics behind the OC-SVM is fundamentally based on the previously presented concepts. Briefly, OC-SVM computes or learns a function $h$ which defines a hypersphere which encloses the positive examples/observations (representing the target class), while all other observations are not necessary for the complete definition of the hypersphere.

More particularly, the OC-SVM operates by mapping the training feature vectors into a high-dimensional feature space and by finding in the high-dimensional feature space a hypersphere that encompasses all the training feature vectors, the hypersphere having a given center, a given radius defining the detection threshold and a surface in the high-dimensional feature space defined by the support vectors.

The obtained support vectors together with some SVM specific parameters, such as the center and the radius of the hypersphere, form the reference template which represents the normal behavior of the IP-based network.

Therefore, according to the present invention, the OC-SVM variables that need to be set are the kernel function, the C constant, the training set size and the support vectors size. The output of the OC-SVM consists in the value of the parameters of the kernel, the number of support vectors, the support vectors themselves, the weights (or $\alpha$ coefficients, also known as Lagrangian multipliers) of each support vector and a detection threshold which is practically the radius of the hypersphere.

According to the present invention, a SEQUENCE linear kernel function is exploited, the SEQUENCE linear kernel function being comprised in Chih-Chung Chang and Chih-Jen Lin, *LIBSVM: a library for support vector machines*, 2001, which is hereby incorporated by reference, and wherein the SEQUENCE linear kernel function is introduced for sequences.

In particular, according to Applicant's experimentations, the SEQUENCE linear kernel function outperforms other kernel functions for this specific task. The OC-SVM used in this way automatically produces all the information necessary for reference template creation, i.e., the support vectors, their weights, the center and the radius of the hypersphere, i.e., the detection threshold.

Moreover, the detection module 43 computes, for each detection feature vector provided at a given moment in time by the feature extraction module 42, and representing a live feature set, a corresponding distance between the detection feature vector and the center of the hypersphere obtained during the training and comprised in the reference template.

Relating to distance computation performed by the detection module 43, a third aspect of the present invention refers to implementation of a new distance metric to be used in the OC-SVM classification algorithm.

In particular, a new distance function to be used with OC-SVM is here proposed. This distance function works on sequences, numerical or alphanumerical, or vectors of real or integer values, and is a newly defined metric, different from known distances, such as the Hamming distance and edit distances, e.g., the Levenshtein distance.

As is known, the Hamming distance between two sequences (usually binary sequences) counts the number of positions in which the sequences differ. For example, the Hamming distance between sequences 0011 and 0101 is two.

The Levenshtein distance between two strings a and b is the number of deletions, insertions and substitutions required to transform a in b. For example, the distance between "test" and "tent" is one because with one substitution "tent" is transformed in "test".

The distance computation according to the present invention takes into account both the positions in which two sequences are different, and how many positions are in between two symbols present in both sequences.

In particular, an example of the distance computation according to the present invention will be now described with reference to FIG. 5.

Figure 5:
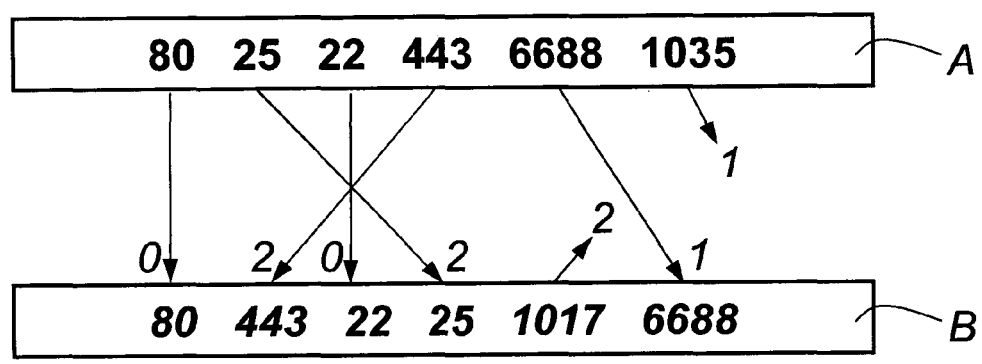
FIG. 5 shows an example of vector/sequence distance computing according to an embodiment of the present invention.

In detail, FIG. 5 shows two vectors A and B each containing respective feature items. The feature items represent TCP-based application ports. The vector A is the center of the hypersphere obtained during the training, while B is a detection feature vector.

The distance between A and B is computed as follows: for each port that is present in both vectors A and B a respective number of positions that separate the port in the two vectors in either direction is counted. Then, to obtain the distance between the vectors A and B the counted numbers for all the ports present in both vectors A and B are summed together.

Moreover, for each port that is present only in one vector, a respective value that relates to the port's position inside the vector is added to the distance. This contribution of the single port to the total distance is bigger if the position is smaller, meaning that if the port occupies an important position in the vector, hence is a port that received or generated much traffic, its anomalous position has more importance/severity. As a consequence, the smaller is the port's position (0 is the most important), the higher is the distance and hence the severity level of a possible alert. A smaller position means the corresponding port is significant for the monitored IP-based network, hence its contribution to the anomaly is important.

Considering vectors of length L, in FIG. 5 the length L of vectors A and B being equal to 6, if a new port is in position i, with i comprised between 0 and L−1, its contribution to the distance is: L−i. If the port is on the first position (i.e., i=0) its contribution is the biggest possible, i.e., L, while a new port in the last position (i.e., i=L−1) represents a less severe condition, its contribution being 1.

So, as shown in FIG. 5, the vectors A and B have two ports, i.e., port 80 and port 22, in the same position, and, therefore, these two ports give no contribution to the distance.

Moreover, the vectors A and B have the port 25 in different positions which are distant two positions, and, therefore, the port 25 gives a contribution of 2 to the distance.

Furthermore, the vectors A and B have the port 443 in different positions which are distant two positions, and, therefore, the port 443 gives a contribution of 2 to the distance.

Moreover, the vectors A and B have the port 6688 in different positions which are distant one position, and, therefore, the port 6688 gives a contribution of 1 to the distance.

Furthermore, the vector A has the port 1035 which is not present in the vector B and is in the last position of the vector A, i.e., position 5, and, therefore, the port 1035 gives a contribution of 1 to the distance.

Moreover, the vector B has the port 1017 which is not present in the vector A and is in the position 4 of the vector A, and, therefore, the port 1017 gives a contribution of 2 to the distance.

Therefore, according to the present invention, the distance between the vectors A and B is 8.

Coming back to detailed description of the detection module 43, if the distance between the detection feature vector and the center of the hypersphere is shorter than the detection threshold, i.e. the radius of the hypersphere, the detection module 43 classifies the detection feature vector as belonging to the normal class, otherwise an anomaly is detected and an alarm is issued.

The severity of the alarm is directly proportional to the average distance between the detection feature vector and the reference hypersphere.

Alternatively, the anomaly detection may be implemented by means of a decision fusion scheme. In the simplest case, the fusion rule may be based on majority voting. A simple majority voting scheme includes:

computing a distance between each detection feature vector and the center of the hypersphere; and detecting an anomaly if the number of detection feature vectors with a distance lower than the anomaly detection threshold in relation to the total number of detection feature vectors is lower than a given value.

Other fusion rules can be implemented if required.

In conclusion, the present invention proposes an anomaly detection method and system for packet-based networks, such as IP-based networks, based on a real-time monitoring of the sequences of the top N most-used network resources, such as network applications, IP addresses, specific protocols message types, etc., taking into consideration the amount of traffic generated/received by each network resource. For each category of network resources, the system builds the corresponding OC-SVM models on time of day basis. This approach results in models which are quite stable during normal network operation, so an anomaly is clearly identified by the system.

In particular, applying the present invention in a time of day aware manner means that it is possible to build different OC-SVM models for different time intervals during the day, and that it is also possible to build different OC-SVM models for working days and holidays.

Moreover, when the proposed method is used to detect anomalies in application, control and management protocols, it becomes particularly appropriate for detecting new worm propagations and zero day attacks at specific applications/services provided by the monitored network. The application and control protocol sequences are quite stable in particular time intervals, and the above cited attacks usually provoke significant changes in these sequences.

The advantages of the present invention are clear from the foregoing.

In particular, not only the training, but also the anomaly detection is significantly simplified with one-class Support Vector Machines, since only one reference template is used for the anomaly detection and not an arbitrary number of attack signatures as in misuse detection. Consequently, the anomaly detection according to the present invention is faster and its duration does not depend on the size of an additional database.

Additionally, a large number of anomalies occurring in the monitored IP-based network are detected in real time and in a very reliable and efficient way.

Finally, it is clear that numerous modifications and variants can be made to the present invention, all falling within the scope of the invention, as defined in the appended claims.

For example, according the present invention it is also possible to monitor at the same time network resources belonging to different categories, such as network applications, IP messages, and over-IP protocols, and to detect anomalies based on sequences of top N most-used network resources belonging to the same category, or on sequences of top N most-used network resources belonging to the different categories.

Moreover, it is again pointed out that the present invention may be applied to any packet-based network other than the aforementioned IP-based network.

Furthermore, the present invention may also be used to detect anomalies in the usage of control and management protocols, and also in routing protocols. The control protocols that can be taken into consideration can be ICMP, Internet Group Management Protocol (IGMP), Simple Network Management Protocol (SNMP), Domain Name System (DNS) etc., while the routing protocols can be those used in IP networks, such as OSPF. In general, the only request to apply the present invention is that the protocols are able to manage different message types.

The invention claimed is:

1. An anomaly detection method for a packet-based network, the packet-based network comprising several network resources, the method comprising:

forming training feature vectors based on network resources monitored and ordered during a training period;

obtaining, based on the training feature vectors, a first vector of a first network resource category comprising a sequence of network resources belonging to the first network resource category;

monitoring the network resources of the packet-based network, wherein the monitored network resources belong to two or more network resource categories;

forming two or more sequences of network resources comprising a first sequence of network resources belonging to a first network resource category and a second sequence of network resources belonging to a second network resource category, wherein network resources in each sequence are ordered based on a respective amount of data traffic generated or received by each monitored network resource;

forming a detection feature vector for the first network resource category based on the sequence of network resources belonging to the first network resource category;

determining at least one difference in position of at least one network resource between a position of the least one network resource in the first vector and a position of the at least one network resource in the detection vector; and detecting an anomaly in the packet-based network based on the at least one difference in position of the at least one network resource.

2. The method of claim 1, wherein detecting an anomaly includes:

feeding the detection feature vector for at least one of the network resource categories to a machine learning system configured to detect an anomaly in the packet-based network based on the detection feature vector for the at least one of the network resource categories.

3. The method of claim 2, wherein the detection feature vector for at least one of the network resource categories comprises detection feature items related to corresponding monitored network resources, and arranged in the detection feature vector depending on the ordering of the corresponding monitored network resources.

4. The method of claim 3, wherein the detection feature items are arranged in the detection feature vector according to an order identical to the ordering of the corresponding monitored network resources.

5. The method of claim 3, wherein the machine learning system is a one-class classifier.

6. The method of claim 5, wherein the one-class classifier is a one-class support vector machine.

7. The method of claim 1, wherein the packet-based network is based on Internet Protocol (IP), and wherein the network resources are network-related software objects belonging to two or more of the following categories:
- ports;
- network applications;
- Internet Protocol addresses;
- specific protocol message types;
- over-Internet-Protocol protocols;
- Internet Control Message Protocol (ICMP) messages; and
- routing protocols messages.

8. An anomaly detection method for a packet-based network, the packet-based network comprising several network resources, the method comprising:
- monitoring the network resources of the packet-based network;
- ordering the monitored network resources based on a respective amount of data traffic generated or received by each monitored network resource;
- training a one-class support vector machine during a training period including:
  - monitoring and ordering the network resources during the training period, ordering being based on a respective amount of data traffic generated or received by each monitored network resource;
  - forming respective training feature vectors based on the network resources monitored and ordered during the training period, each training feature vector comprising respective training feature items which are related to corresponding network resources monitored and ordered during the training period, and are arranged in the training feature vector depending on the ordering of the corresponding network resources monitored and ordered during the training period; and
  - training the one-class support vector machine based on the training feature vectors; and
- detecting an anomaly in the packet-based network based on the ordered network resources.

9. The method of claim 8,
wherein detecting an anomaly includes:
- forming a detection feature vector based on the ordered network resources, wherein the detection feature vector comprises detection feature items related to corresponding monitored network resources, and arranged in the detection feature vector depending on the ordering of the corresponding monitored network resources; and
- feeding the detection feature vector to a machine learning system configured to detect an anomaly in the packet-based network based on the detection feature vector;

wherein the one-class support vector machine operates by mapping the training feature vectors into a high-dimensional feature space, and by computing in the high-dimensional feature space a hypersurface encompassing all the training feature vectors and modelable via a given center and a given radius defining an anomaly detection threshold, the one-class support vector machine including support vectors defined by training feature vectors closest to the hypersurface;

wherein training the one-class support vector machine includes computing a reference template including the support vectors, and the center and the radius of the hypersurface;

wherein detecting an anomaly further includes detecting an anomaly in the packet-based network based on the reference template and the detection feature vector; and wherein detecting an anomaly in the packet-based network based on the reference template and the detection feature vectors comprises:
- computing a distance between the detection feature vector and the center of the hypersurface; and
- detecting an anomaly in the packet-based network based on the computed distance and the radius of the hypersurface.

10. The method of claim 9, wherein the training period is a substantially free-of-attacks and free-of-failures time period, and wherein the reference template represents a free-of-attacks and free-of-failures behaviour of the packet-based network.

11. The method of claim 9, wherein computing a distance between the detection feature vector and the center of the hypersurface comprises computing a distance based on:
- for each detection feature item comprised also in the center of the hypersurface, and arranged in the center of the hypersurface in a first position different from a second position in which the detection feature item is arranged in the detection feature vector, a corresponding distance between the first and the second position;
- for each detection feature item not comprised in the center of the hypersurface, a corresponding value indicative of a position in which the detection feature item is arranged in the detection feature vector; and
- for each feature item comprised in the center of the hypersurface, and not comprised in the detection feature vector, a corresponding value indicative of a position in which the feature item is arranged in the center of the hypersurface.

12. An anomaly detection system for a packet-based network, comprising:
- a processor;
- a memory storing a software program that, when executed by the processor, is configured to cause the system to:
  - form training feature vectors based on network resources of a packet-based network monitored and ordered during a training period;
  - obtain, based on the training feature vectors, a first vector of a first network resource category comprising a sequence of network resources belonging to the first network resource category;
  - monitor the network resources of the packet-based network, wherein the monitored network resources belong to two or more network resource categories;
  - form two or more sequences of network resources comprising a first sequence of network resources belonging to a first network resource category and a second sequence of network resources belonging to a second network resource category, wherein network resources in each sequence are ordered based on a respective amount of data traffic generated or received by each monitored network resource;
  - form a detection feature vector for the first network resource category based on the sequence of network resources belonging to the first network resource category;
  - determine at least one difference in position of at least one network resource between a position of the least one network resource in the first vector and a position of the at least one network resource in the detection vector; and
  - detect an anomaly in the packet-based network based on the at least one difference in position of the at least one network resource.

13. The system of claim 12, wherein the packet-based network is based on Internet Protocol (IP), and wherein the network resources are network-related software objects belonging to two or more of the following categories:
- ports;
- network applications;
- Internet Protocol addresses;
- specific protocol message types;
- over-Internet-Protocol protocols;
- Internet Control Message Protocol (ICMP) messages; and
- routing protocols messages.

14. The system of claim 12, wherein detect an anomaly includes:
   feed the detection feature vector for at least one of the network resource categories to a machine learning system configured to detect an anomaly in the packet-based network based on the detection feature vector for the at least one of the network resource categories.

15. The system of claim 14, wherein the detection feature vector for at least one of the network resource categories comprises detection feature items related to corresponding monitored network resources, and arranged in the detection feature vector depending on the ordering of the corresponding monitored network resources.

16. The system of claim 15, wherein the detection feature items are arranged in the detection feature vector according to an order identical to the ordering of the corresponding monitored network resources.

17. A non-transitory machine readable medium having a software program stored thereon that, when executed by a processor, cause an anomaly detection system for a packet-based network to:
   form training feature vectors based on network resources of a packet-based network monitored and ordered during a training period;
   obtain, based on the training feature vectors, a first vector of a first network resource category comprising a sequence of network resources belonging to the first network resource category;
   monitor the network resources of the packet-based network, wherein the monitored network resources belong to two or more network resource categories;
   form two or more sequences of network resources comprising a first sequence of network resources belonging to a first network resource category and a second sequence of network resources belonging to a second network resource category, wherein network resources in each sequence are ordered based on a respective amount of data traffic generated or received by each monitored network resource;
   form a detection feature vector for the first network resource category based on the sequence of network resources belonging to the first network resource category;
   determine at least one difference in position of at least one network resource between a position of the least one network resource in the first vector and a position of the at least one network resource in the detection vector; and
   detect an anomaly in the packet-based network based on the at least one difference in position of the at least one network resource.

18. The non-transitory machine readable medium of claim 17, wherein the packet-based network is based on Internet Protocol (IP), and wherein the network resources are network-related software objects belonging to two or more of the following categories:
- ports;
- network applications;
- Internet Protocol addresses;
- specific protocol message types;
- over-Internet-Protocol protocols;
- Internet Control Message Protocol (ICMP) messages; and
- routing protocols messages.

19. The non-transitory machine readable medium of claim 17, wherein detect an anomaly includes:
   feed the detection feature vector for at least one of the network resource categories to a machine learning system configured to detect an anomaly in the packet-based network based on the detection feature vector for the at least one of the network resource categories.

20. The non-transitory machine readable medium of claim 19, wherein the detection feature vector for at least one of the network resource categories comprises detection feature items related to corresponding monitored network resources, and arranged in the detection feature vector depending on the ordering of the corresponding monitored network resources.

21. An anomaly detection method for a packet-based network, the packet-based network comprising several network resources, the method comprising:
   monitoring the network resources of the packet-based network;
   ordering the monitored network resources according to a given ordering criterion;
   detecting an anomaly in the packet-based network based on the ordered network resources, wherein detecting the anomaly includes:
      forming a detection feature vector based on the ordered network resources; and
      feeding the detection feature vector to a one-class support vector machine (OC-SVM) configured to detect an anomaly in the packet-based network based on the detection feature vector;
   training the one-class support vector machine during a training period, the training period being a substantially free-of-attacks and free-of-failures time period, wherein training the one-class support vector machine includes:
      monitoring and ordering the network resources during the training period, the ordering being according to the given ordering criterion;
      forming respective training feature vectors based on the network resources monitored and ordered during the training period, each training feature vector comprising respective training feature items which are related to corresponding network resources monitored and ordered during the training period, and are arranged in the training feature vector depending on the ordering of the corresponding network resources monitored and ordered during the training period; and
      training the one-class support vector machine based on the training feature vectors.

22. The method of claim 21, wherein the detection feature vector comprises detection feature items related to corresponding monitored network resources, and arranged in the detection feature vector depending on the ordering of the corresponding monitored network resources.

23. The method of claim 22, wherein the detection feature items are arranged in the detection feature vector according to an order identical to the ordering of the corresponding monitored network resources.

* * * * *